United States Patent [19]

Becker et al.

[11] 4,305,261
[45] Dec. 15, 1981

[54] CONTROLLABLE PHASE SEPARATOR FOR SEALING CONTAINERS FILLED WITH SUPERFLUID HELIUM

[75] Inventors: Joachim R. Becker, Immenstaad; Egon H. Siewert, Hagnau, both of Fed. Rep. of Germany

[73] Assignee: Dornier-System GmbH, Friedrichshafen, Fed. Rep. of Germany

[21] Appl. No.: 132,874

[22] Filed: Mar. 24, 1980

[30] Foreign Application Priority Data

Mar. 28, 1979 [DE] Fed. Rep. of Germany ....... 2912227

[51] Int. Cl.³ ............................................ F25B 19/00
[52] U.S. Cl. .................................... 62/514 R; 62/381
[58] Field of Search .................. 62/514 R, 381, 6, 49; 310/52; 55/203

[56] References Cited

U.S. PATENT DOCUMENTS

| | | | |
|---|---|---|---|
| 2,677,942 | 5/1954 | Schott et al. | 62/381 |
| 3,474,272 | 10/1969 | Newell | 310/52 |
| 3,692,095 | 9/1972 | Fleming | 62/6 |
| 4,134,037 | 1/1979 | Berthet et al. | 62/514 R |
| 4,209,061 | 6/1980 | Schwemin | 62/6 |

OTHER PUBLICATIONS

Petrac et al. "Evaluation of Porous-Plug Liquid Separators of Space Superfluid Helium Systems," Jet Propulsion Laboratory, Cal. Tech., Pasadena, Ca.

*Primary Examiner*—Ronald C. Capossela
*Attorney, Agent, or Firm*—Marianne Rich

[57] ABSTRACT

The mass flow rate of helium from a container is controlled by two disks having highly polished mating surfaces and mounted for rotation relative to one another. Each of the disks has at least one axial through passage, at least one of the disks having a through passage which is eccentric to the axis of rotation of the disk. Use of a plurality of through passages in one of the disks, one or more capillary grooves emanating from one of the through passages in one disk and terminating in the circular path described by the through passage in the other disk for controlling the flow rate is illustrated. For example a step motor in combination with a wobble plate rotates one disk in very exact steps relative to the other.

17 Claims, 9 Drawing Figures

CONTROLLABLE PHASE SEPARATOR FOR SEALING CONTAINERS FILLED WITH SUPERFLUID HELIUM

The present invention relates to controllable phase separators for containers filled with helium in its superfluid state.

BACKGROUND AND PRIOR ART

Superfluid helium is used, for example, during space travel for cooling of equipment. Superfluid helium is in a one phase state and there are no difficulties at the orifice of the container concerning the phase boundary liquid/gas (two phases). There is always a superfluid helium film of finite thickness at the wall of the container and so at the orifice. Only the thickness of this film is affected by the direction and magnitude of the applied force of gravity.

In known systems, such phase separators consist of plugs of a porous ceramic material or of sintered metals. Rolled, contracted foils can also be used. The mass flow then takes place through the capillaries of the plug. All of the abovementioned phase separators are passive systems in which the mass flow of helium and therefore the cooling power cannot be regulated to the required extent. An exact regulation is, however, essential when the heating losses of the equipment to be cooled vary greatly during operation.

SUMMARY OF THE INVENTION

It is an object of the present invention to furnish a phase separator of the above-described type which does not require fine positioning apparatus and which allows regulation over a wide range with relatively simple, inexpensive equipment.

In accordance with the present invention, the phase separator comprises a first and second disk having highly polished mating surfaces and mounted for rotation relative to one another. Each of the disks has at least one axial through passage, at least one of the through passages being eccentric to the axis of rotation of the disks. In a particularly preferred embodiment, the rotation of one disk relative to the other is carried out by a motor. If the motor is a step motor, the positioning can take place in very accurate, small steps without requiring more than a counter to determine the actual position.

In embodiments of the invention wherein the roughness of the surface of the two polished disks is in the order of 10 $\mu$m, this gap between the two disks permits the flow of helium, i.e. the superfluid helium then flows out of the container through a through passage in one disk, the gap, and the through passage in the other disk.

In embodiments of the present invention where the roughness of the highly polished surfaces is less than 2 $\mu$m, the two mating surfaces can be used to seal the container. For improved control of helium flow, one of the disks has capillary grooves which extend from its through passage. Rotation of the disks relative to each other with attendant differences in distance between the two through passages results in a control of the mass flow of helium.

The novel features which are considered as characteristic for the invention are set forth in particular in the appended claims. The invention itself, however, both as to its construction and its method of operation, together with additional objects and advantages thereof will best be understood from the following description of specific embodiments when read in connection with the accompanying drawing.

DESCRIPTION OF THE PREFERRED EMBODIMENT

Figure 1:
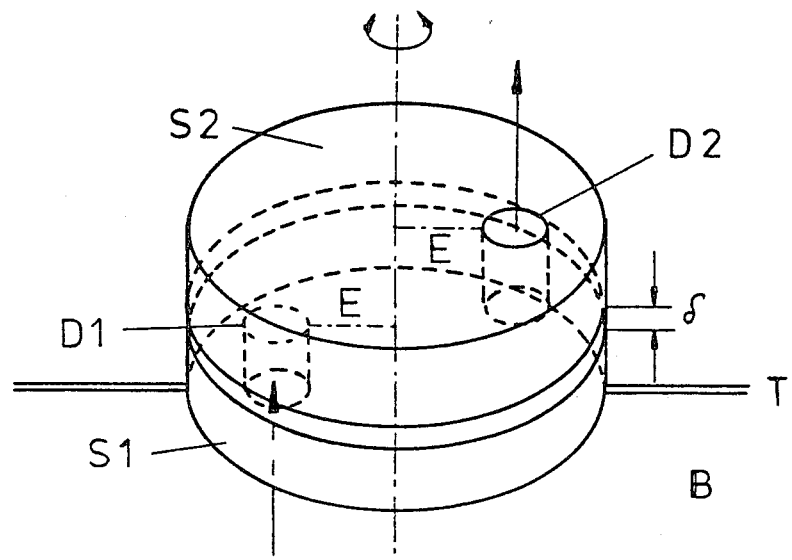
FIG. 1 is a perspective view of the basic arrangement of the two disks according to the present invention.

The basic principle of the invention will first be explained with reference to FIGS. 1 and 2, without taking dimensions and actual construction into consideration. It will become evident that a phase separator according to the present invention may be constructed in many different forms.

Figure 3:
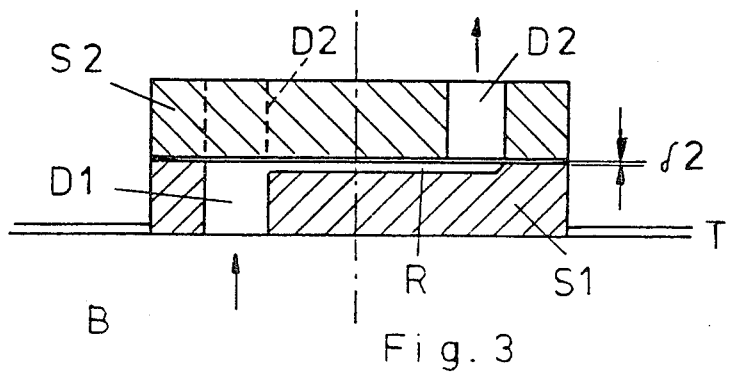
FIG. 3 is a variation of the sectional view of FIG. 2.

In the main, the phase separator comprises a first and second disk, S1 and S2, whose mating surfaces are polished. Because of the roughness of the two surfaces, a gap $\delta$ exists between the two disks. Disk S1 is supported by a wall T which also separates the interior B of the container from the external environment. The disk S2 is mounted on top of disk S1 and may be rotated relative thereto. This is indicated by the arrow around the axis of rotation of the two disks. The latter is indicated by a dash dot line. Each of the disks has a through passage, for example a bore. The bore in disk S1 is denoted by D1, while that in disk S2 is denoted by D2. Both bores are eccentrically arranged at a distance E from the axis of rotation. Rotation of the disks relative to each other will thus cause one of the through passages to move along a circular path relative to each other, thereby changing the distance between the two bores. As shown in FIG. 3, as a special case bores D1 and D2 may be moved to a position where they overlap fully. It should also be noted that bores D1 and D2 may be located at different distances from the axis of rotation so that they may overlap only partially or may perhaps not overlap at all.

Figure 2:
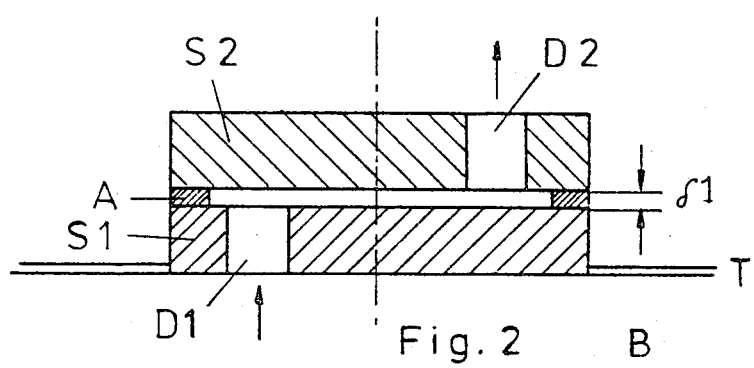
FIG. 2 is an axial sectional view of the two disks of FIG. 1.

In FIG. 2 it is assumed that the roughness of the polished surfaces are such that a gap in the order of magnitude of approximately 10 $\mu$m exists or, alternatively, that for a lesser roughness a sealing ring A at the circumference of the disk causes a gap $\delta 1$ of, for example, between 10-15 $\mu$m to be formed. The helium will then pass from the inside B of the container in the direction of the arrow through through passage D1, gap $\delta 1$, and bore D2 in the direction of the arrow. It is, of course, possible that each disk has a plurality of through passages rather than just one. A wide variety of designs is possible. Another possibility for varying the design includes the selection of the material for the disks. For example, a non-porous material may be used, or one of the two disks may be made of a porous material. When a porous material is used, a steady minimum flow of helium will result, thereby assuring at least a minimum cooling effect. The rotation of the disks relative to each other then controls whatever additional amounts of mass flow may be required.

Disk S2 may be rotated relative to disk S1 by a motor, which, preferably, is a step motor. A particularly fine regulation may be achieved by use of a step motor with a wobble plate. This allows very fine positioning without complicated measuring apparatus. Disk S2 may be rotated automatically, that is, in dependence on the required cooling power or in dependence upon the temperature in the container. A suitable digital step motor with wobble plate is disclosed in U.S. Pat. No. 3,644,764 (Newell) issued Feb. 22, 1972.

The embodiment shown in FIG. 3 corresponds to that in FIG. 2, but it is assumed that the roughness of the highly polished surfaces is considerably less. The mating surfaces of disks S1 and S2 therefore lie directly on top of one another. The distance δ2 is assumed to be less than 2 μm. The two mating surfaces therefore actually provide a seal so that no flow of helium occurs if bores D1 and D2 are not aligned. To allow a mass flow of helium even when bores D1 and D2 are not aligned, a capillary groove R is provided in the top surface of disk S1. Capillary groove R emanates from bore D1. The mass flow of helium now takes place from the interior B of the container, through bore D1, capillary groove R and bore D2 in the direction of the arrow to the exterior environment. The flow rate depends both on the length of capillary groove R and its cross sectional area. It is easy to see that use of capillary grooves of different lengths and different cross sectional areas allow a wide range of control, as well as a very exact control. In the position of bore D2 relative to bore D1 indicated in dashed lines in FIG. 3, the two bores are fully aligned. In this position, the phase separator allows filling of container B or acts as a safety valve.

Figure 4:
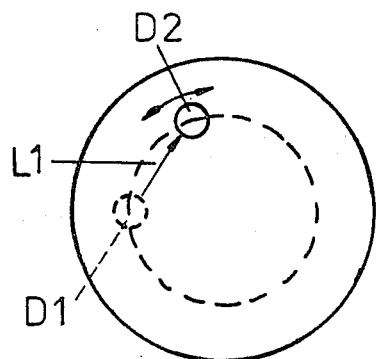
FIGS. 4-6 are schematic top views illustrating different through passage arrangements.
Figure 5:
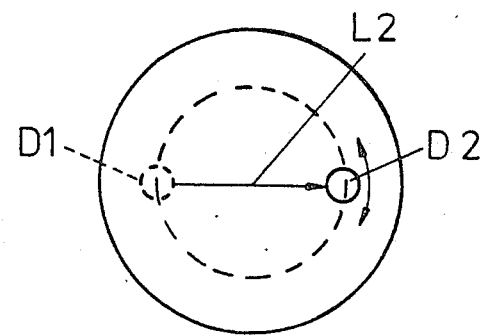

FIGS. 4 and 5 show top views of the arrangement shown in FIG. 2. Since bore D1 is in the lower disk and therefore not directly visible, it is indicated by dashed lines. Bore D2 in the top disk is rotatable in either direction (double arrow) along a circular path indicated by dashed lines. This allows the distance between bores D1 and D2 to be varied. The distances between the two bores are indicated by the lengths L1 and L2 of the arrows between the two bores in FIGS. 4 and 5, respectively. The mass flow takes place more or less throughout the whole gap between disks S1 and S2. The flow rate depends upon the distance δ1, i.e. the height of the gap, as well as the distance between bores, L1, L2.

Figure 6:
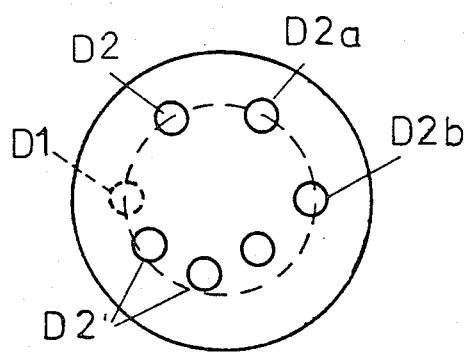

For FIG. 6, it is assumed that the two disks are, for example, made of metal, glass, ceramic or plastic and have highly polished surfaces which effect a seal. A bore D1 is in the lower disk, while three bores D2, D2a and D2b are in disk S2. Each of the three bores D2, D2a or D2b can be aligned with bore D1 by rotation of the disk. Let it first be assumed that bore D2 is a smooth bore, so that alignment of bores D1 and D2 allow the container to be filled as mentioned above. Further, let it be assumed that bore D2a is filled by a porous material having a predetermined capillary size. Suitable materials would, for example, be sintered metals, sintered ceramics and glasses.

When this bore overlaps bore D1, the rate of mass flow is determined by the porosity of the material in bore D2a. If it is now assumed that bore D2b is filled with a material of a different porosity, a different rate of flow will result when bore D2b is aligned with bore D1. The rate of mass flow may therefore be varied in steps by use of materials of different porosity. Typical values of porosity of suitable materials for this application are given, for example, in the article "Evaluation of Porous-Plug Liquid Separators for Space Superfluid Helium System" D. Petrac and P. V. Mason Jet Propulsion Laboratory, California Institute of Technology.

A variation of this principle is illustrated in FIG. 6 with bores D2'. Here three bores D2' of different eccentricity are provided so that these bores will overlap only partially and to a greater or lesser degree with bore D1. If all bores D2' are filled with a material having the same porosity, then the rate of mass flow can be controlled by the fact that, depending upon the eccentricity, a greater or lesser effective cross sectional area of bore D2 and bore D2' will be effective, that is will overlap. Again a stepwise variation of rate of mass flow is achieved.

Figure 7:
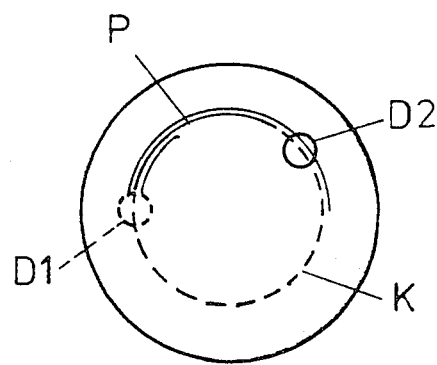
FIGS. 7-9 are schematic top views of various arrangements of capillary grooves.
Figure 8:
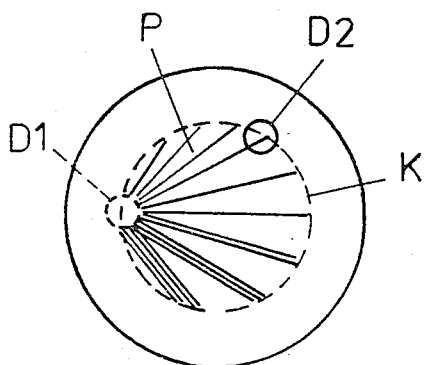
Figure 9:
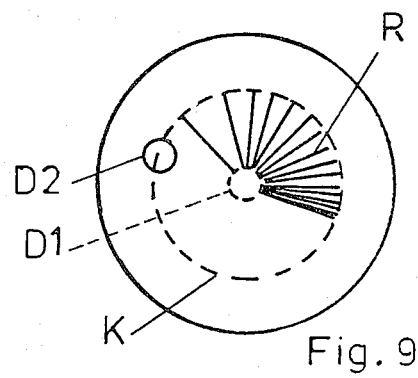

FIGS. 7–9 illustrate different possibilities of controlling mass flow with the aid of capillary grooves R in the upper surface of a disk. In all illustrated examples, the capillary grooves R are illustrated as extending from bore D1. It should be noted that the depth of the grooves is to be in the region between 2 and 15 μm. To achieve an effective cross section, the width of the grooves may differ or a number of equidistant grooves may be provided to constitute a field of grooves forming the connection to exit bore D2. It is also possible that a groove or grooves may be provided whose cross sectional area changes along its length.

In FIG. 7, circular capillary grooves R emanating from bore D1 are illustrated. These grooves extend along the circular path described by bore D2 as disk S2 is rotated relative to disk S1 and are of different lengths. Therefore, depending upon the position of bore D2 either one or a plurality of grooves is effective. Also, of course, the length of the circular arc between bore D1 and D2 changes.

In FIG. 8, a plurality of grooves R extent in a fan shape from bore D1. All grooves R end on the circular path K traversed by bore D2. The effective length of the grooves corresponds approximately to that of the grooves illustrated in FIGS. 4 and 5. It is also indicated in FIG. 8 that a plurality of grooves R can be arranged in a direction parallel to one another. This increases the effective cross section and constitutes another possibility for controlling the mass flow.

In the embodiment shown in FIG. 9, bores D1 and D2 are arranged with different eccentricities. As an extreme case, it is assumed that the eccentricity of the bore of the lower disk is zero, that is bore D1' is arranged at the center of the disk. Capillary grooves R fan out from bore D1, that is they extend in a direction perpendicular to the axis of rotation. Specifically, they extend up to the circular path followed by bore D2 during its rotation relative to bore D1. The density of grooves R increases as bore D2 is rotated in a clockwise direction. Depending upon the position of bore D2 relative to bore D1, a greater number or a lesser number of grooves R becomes effective in connecting bore D1 to bore D2. Again, the flow rate of helium will vary as a function of the relative position of bore D2 to that of bore D1.

While the invention has been illustrated in preferred embodiments, it is not to be limited to the equipment and structures shown, since many variations thereof will be evident to one skilled in the art and are intended to be encompassed in the present invention as set forth in the following claims.

We claim:

1. Controllable phase separator device for regulating the mass flow of helium from a container filled with super-fluid helium to an external environment, comprising a first and second disk having highly polished mating surfaces and mounted for rotation relative to one another about an axis of rotation, said first and second disk having, respectively, at least a first and second axial through passage, at least one of said through passages being eccentric to said axis of rotation, whereby the rate of flow of said helium differs for different angular positions of said first disk relative to said second disk.

2. A device as set forth in claim 1, wherein said first and second through passages are located, respectively, at a first and second predetermined distance from said axis of rotation.

3. A device as set forth in claim 2, wherein said first and second predetermined distances are substantially equal.

4. A device as set forth in claim 2, wherein said first and second predetermined distances differ from each other.

5. A device as set forth in claim 1, wherein said second disk has a plurality of eccentric axial through passages.

6. A device as set forth in claim 5, wherein all of said through passages are located at the same distance from said axis of rotation.

7. A device as set forth in claim 5, wherein each of said plurality of eccentric axial through passages in said second disk is filled with porous material.

8. A device as set forth in claim 7, wherein each of said plurality of axial through passages in said second disk is filled with a porous material having a porosity different from the porosity of the material in at least one other of said through passages.

9. A device as set forth in claim 1, wherein at least one of said disks is constituted at least in part by a porous material.

10. A device as set forth in claim 1, wherein said highly polished surface of said first disk has a plurality of capillary grooves extending from said first through passage.

11. A device as set forth in claim 10, wherein said capillary grooves fan out from said first through passage.

12. A device as set forth in claim 11, wherein said second disk rotates about said axis of rotation, whereby said second through passage describes a circular path; and wherein said capillary grooves extend to said circular path.

13. A device as set forth in claim 10, wherein said second disk rotates about said axis of rotation, whereby said second through passage travels along a circular path; and wherein said capillary grooves in said first disk extend from said first through passage along at least a part of said circular path.

14. A device as set forth in claim 10, wherein said capillary grooves are arranged equidistant from each other.

15. A device as set forth in claim 10, wherein each of said capillary grooves has a length differing from the length of at least one of said grooves.

16. A device as set forth in claim 10, wherein each of said capillary grooves has a cross section having a different area from that of at least one other of said capillary grooves.

17. A device as set forth in claim 1, further comprising a step motor for rotating one of said disks relative to the other.

* * * * *